(12) United States Patent
Contractor et al.

(10) Patent No.: US 11,544,478 B2
(45) Date of Patent: Jan. 3, 2023

(54) GENERATING DIALOG SYSTEM WORKSPACES

(71) Applicant: International Business Machines Corporation, Armonk, NY (US)

(72) Inventors: Danish Contractor, New Delhi (IN); Nikhil Verma, Nagar Haveli (IN); Harshit Kumar, New Delhi (IN); Sachindra Joshi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 16/892,805

(22) Filed: Jun. 4, 2020

(65) Prior Publication Data
US 2021/0383077 A1 Dec. 9, 2021

(51) Int. Cl.
*G06F 40/56* (2020.01)
*G06Q 10/10* (2012.01)
*G06F 16/9032* (2019.01)
*G06F 16/93* (2019.01)
*G06N 5/04* (2006.01)

(52) U.S. Cl.
CPC ........ *G06F 40/56* (2020.01); *G06F 16/90332* (2019.01); *G06F 16/93* (2019.01); *G06N 5/04* (2013.01); *G06Q 10/10* (2013.01)

(58) Field of Classification Search
CPC . G06N 5/02; G06N 3/006; G06N 5/04; G06F 40/35; G06F 16/93; G06F 16/3329; G06F 16/90332; G06F 40/56; G06Q 10/10
See application file for complete search history.

(56) References Cited

U.S. PATENT DOCUMENTS

| | | |
|---|---|---|
| 7,028,306 B2 | 4/2006 | Boloker et al. |
| 7,143,042 B1 | 11/2006 | Sinai et al. |
| 7,487,440 B2 | 2/2009 | Gergic et al. |

(Continued)

OTHER PUBLICATIONS

Carroll, M. et al., How contexts and follow-up intents work, published in DialogFlow, available at https://blog.dialogflow.com/post/how-contexts-and-followup-intents-work/, Mar. 7, 2018.

(Continued)

*Primary Examiner* — Frantz B Jean
(74) *Attorney, Agent, or Firm* — Ryan, Mason & Lewis, LLP

(57) ABSTRACT

Methods, systems, and computer program products for generating dialog system workspaces are provided herein. A computer-implemented method includes obtaining (i) a set of policy documents and (ii) a set of initial questions; identifying at least one of the policy documents in the set of policy documents that is relevant to answering a given one of the initial questions in the set of initial questions; generating, based at least in part on an analysis of said identified policy document, (i) at least one follow-up question to said given initial question and (ii) two or more candidate answers to said at least one follow-up question; generating a dialog tree comprising at least (i) a parent node corresponding to the at least one follow-up question and (ii) child nodes corresponding to the two or more candidate answers; translating the dialog tree into a dialog workspace; and deploying the dialog workspace in an intelligent dialog system.

20 Claims, 9 Drawing Sheets

(56) References Cited

U.S. PATENT DOCUMENTS

| | | |
|---|---|---|
| 10,049,152 B2 | 8/2018 | Ajmera et al. |
| 11,314,534 B2* | 4/2022 | Maitra .................... G06F 9/453 |
| 2018/0129484 A1 | 5/2018 | Kannan et al. |
| 2019/0286698 A1 | 9/2019 | Gupta et al. |
| 2019/0347319 A1 | 11/2019 | Goyal et al. |
| 2021/0240776 A1* | 8/2021 | Jawagal ............... G06N 3/0454 |
| 2021/0295172 A1* | 9/2021 | Sultan ...................... G06N 3/08 |
| 2021/0326747 A1* | 10/2021 | Shi ........................... G06N 5/04 |

OTHER PUBLICATIONS

Treml, Florian, How to Test a Chatbot—Part 3: The Quest for Test Cases, Chatbots Magazine, https://chatbotsmagazine.com/how-to-test-a-chatbot-part-3-the-quest-for-test-casescb7a90238a40, Apr. 4, 2018.

Berry, Dina et al., Use follow-up prompts to create multiple turns of a conversation, Microsoft Azure, https://docs.microsoft.com/en-us/azure/cognitive-services/qnamaker/howto/multiturn-conversation, Dec. 5, 2019.

Zhong, V., & Zettlemoyer, L. in E3: Entailment-driven extracting and editing for conversational machine reading, arXiv preprint arXiv:1906.05373 (2019).

Pan, Liangming, et al. Recent advances in neural question generation. arXiv preprint arXiv:1905.08949, May 22, 2019.

Zhou, Q., et al., Neural question generation from text: A preliminary study, National CCF Conference on Natural Language Processing and Chinese Computing, pp. 662-671, Springer, Cham, Nov. 2017.

* cited by examiner

GENERATING DIALOG SYSTEM WORKSPACES

FIELD

The present application generally relates to information technology and, more particularly, to human-computer dialog systems.

BACKGROUND

Automated dialog systems are increasingly being utilized to handle human-computer interactions. In general, dialog systems can understand natural-language input and can use machine learning to respond to a user in a way that simulates a conversation between humans.

SUMMARY

In one embodiment of the present disclosure, techniques for generating dialog system workspaces are provided. An exemplary computer-implemented method includes the steps of obtaining (i) a set of policy documents and (ii) a set of initial questions; identifying at least one of the policy documents in the set of policy documents that is relevant to answering a given one of the initial questions in the set of initial questions; generating, based at least in part on an analysis of said identified policy document, (i) at least one follow-up question to said given initial question and (ii) two or more candidate answers to said at least one follow-up question; generating a dialog tree comprising at least (i) a parent node corresponding to the at least one follow-up question and (ii) child nodes corresponding to the two or more candidate answers; translating the dialog tree into a dialog workspace; and deploying the dialog workspace in an intelligent dialog system.

An exemplary computer-implemented method includes the steps of identifying a set of policy rules from documentation information associated with a software application, wherein the set of policy rules are applicable for solving a given question listed on a frequently asked question page associated with said software application; applying said given question and at least one given policy rule in the set of policy rules to a machine learning model, the machine learning being trained to generate (i) one or more binary follow-up questions to said given question and (ii) two candidate answers for each of said one or more binary follow-up questions; generating a dialog tree for said given policy rule, wherein the dialog tree comprises, for each respective one of the binary follow-up questions: (i) a parent node associated with the binary follow-up question and (ii) two child nodes associated with the corresponding two candidate answers; and automatically populating a dialog workspace of an intelligent dialog system based at least in part on said dialog tree, wherein the dialog workspace comprises (i) a set of intents corresponding to the generated one or more binary follow-up questions and (ii) a set of dialog sequences based on traversals of said dialog tree.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Generally, a workspace is a container for all of the artifacts that define the conversation flow for an application, and natural-language processing can occur within such a workspace. According to some example embodiments, the artifacts of a workspace may include intents, entities, and dialog.

An "intent" represents the purpose of a user's input (for example, a question about business locations or a bill payment). A workspace is trained to recognize such intents using examples of user input and indications of which intents they map to.

An "entity" represents a term or object that is relevant to the intents and provides a specific context for an intent (e.g., an entity might represent a city where the user wants to find a business location, or the amount of a bill payment). The workspace is trained to recognize entities based on a list of possible values for each entity and synonyms that users might enter.

A "dialog" is a branching conversation flow that defines how an application responds when it recognizes the defined intents and entities. Accordingly, conversations may be automatically created with users to provide responses based on the intents and entities that are recognized in their input.

As described herein, an exemplary embodiment includes automatically creating a workspace (such as, for example, a Dialog Framework Workspace or a Watson Assistant Workspace), which can help orchestrate personalized dialog with a user about policy and/or rules.

Figure 1:
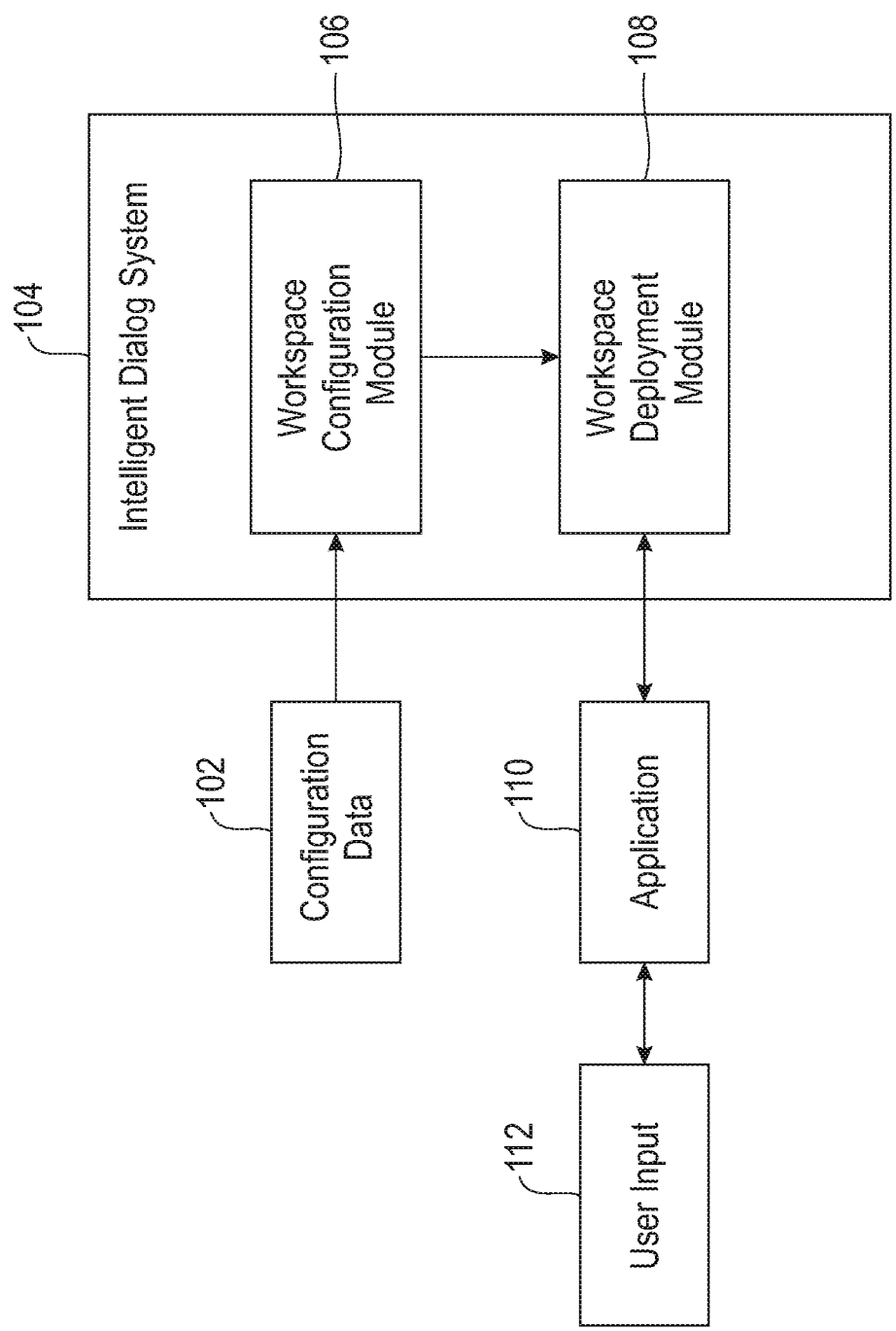
FIG. 1 is a diagram illustrating a system architecture in accordance with exemplary embodiments.

FIG. 1 is a diagram illustrating system architecture in accordance with exemplary embodiments. By way of illustration, FIG. 1 depicts an intelligent dialog system 104 that includes a workspace configuration module 106 and a workspace deployment module 108. The workspace configuration module 106 obtains configuration data 102 for configuring a workspace for an application 110. The configuration of the workspace is described in more detail elsewhere herein. After the workspace is configured, the workspace deployment module 108 allows the workspace to be connected to the application 110 to generate dialog flows based on user input 112 using the configured workspace.

One or more example embodiments include automatically pre-populating a workspace with intent and dialog flow nodes based on a set of documents and a list of questions. For example, the list of questions may be obtained in the form of a frequently asked questions (FAQ) document. For each question in the list, the top k most relevant documents in the set may be determined. In at least one example embodiment, given each of the top k most relevant documents, one or more goal questions, and, optionally, any user-specific data available (e.g., structured data or unstructured data), the following steps may be performed: (1) determining if a tree should be generated given a question document pair; (2) generating one or more follow-up questions and exploring the document by supplying answers (e.g., yes/no answers) to each of the follow-up questions; (3) generating one or more dialog trees where each follow-up question generated acts as an intent node, while the sequence of explorations creates one or more dialog flows; and, (4) when necessary, merging two or more dialog trees. Each of these steps are described in more detail below.

Figure 2:
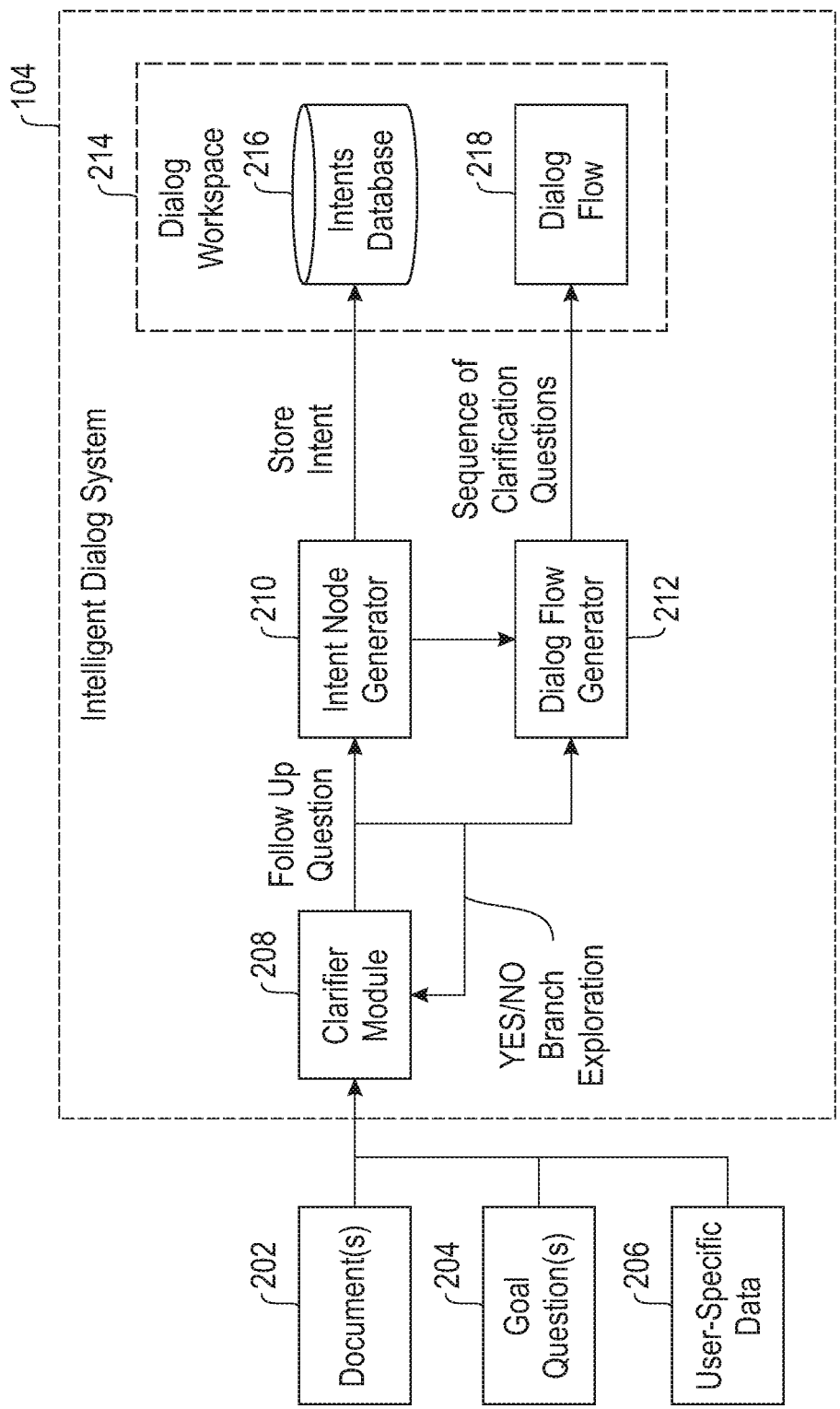
FIG. 2 is a diagram illustrating an example of an intelligent dialog system in accordance with exemplary embodiments.

Referring now to FIG. 2, this figure shows a non-limiting example of an intelligent dialog system (such as, for example, system 104 in FIG. 1) in accordance with exemplary embodiments. The FIG. 2 embodiment includes a clarifier module 208, an intent node generator 210, a dialog flow generator 212, an intents database 216, and a dialog flow 218. The intents database 216 and the dialog flow 218 may correspond to a dialog workspace 214. In this example, the clarifier module 208 may obtain one or more documents 202, one or more goal questions 204, and, optionally, user-specific data 206. The clarifier module 208 may correspond to a machine learning model that generates a dialog based on an initial question and a set of rules. During each turn of the dialog, the machine learning model may generate a follow-up question to inquire about missing information, or conclude the dialogue (e.g., by answering yes, no, or irrelevant). The clarifier module 208 may be implemented in a similar manner as, for example, described by Zhong, V., & Zettlemoyer, L. in *E3: Entailment-driven extracting and editing for conversational machine reading*, arXiv preprint arXiv:1906.05373 (2019), which is incorporated by reference herein in its entirety. Each follow-up question (or clarification) generated by the clarifier module 208 is provided to the intent node generator 210, which stores the follow-up question as an intent node in intents database 216. The dialog flow generator 212 may generate dialog trees by exploring the intent node answers (e.g., the yes/no answers) to generate a dialog flow 218. Additionally, the dialogue trees may be merged when necessary, as described in more detail below in conjunction with FIGS. 3-5. As such, the FIG. 2 embodiment enables a dialogue workspace to be automatically generated based on the one more documents 202 and one more goal questions 204. In at least one example embodiment, the dialogue flow 218 may be output (e.g., via a graphical user interface) for review before it is deployed. The user-specific data 206 may be obtained from, for example, a user profile, the user profile being indicative of, for example, demographic information, previous interactions, etc. Thus, for example, if the user-specific data 206 indicates an age of a user, the dialog flow 218 may skip asking a question that is related to the user's age.

According to one or more exemplary embodiments, a merging algorithm for merging one or more dialogue trees may include: (1) generating embeddings for each of the follow-up questions that were generated; (2) identifying the nearest node and extracting entities from the identified node; (3) generating a new node to act as a parent to constituent trees; and (4) generate branches and a parent question. Identifying the nearest node may optionally be based upon satisfying a threshold value, which can be determined empirically and could vary from corpus to corpus. As those skilled in the art will appreciate, an embedding may correspond to a data structure (such as, for example, a vector) that encodes characteristics of a given follow-up question. In at least one example embodiment, the best node may be identified using, for example, a cosine similarity and/or any another suitable metric or function for matching. Also, entities may be detected in the nodes based on, for example, a sequence labeling algorithm or a dictionary-based approach. Also, the branches and parent questions may be generated using, for example, a rule-based approach, decoder-based approach, or any other suitable natural language generation (NLG) approach.

Figure 3:
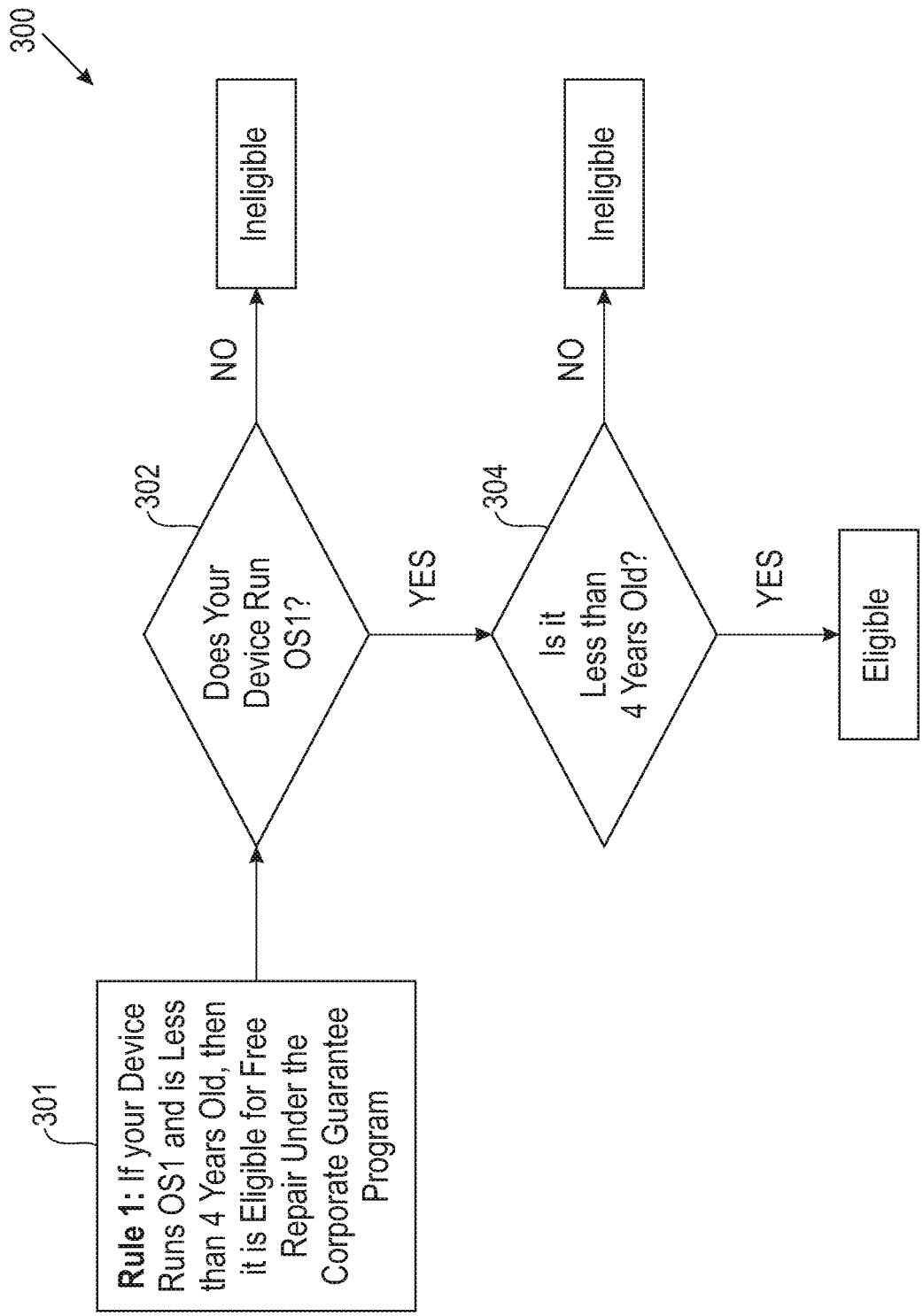
FIG. 3 is a diagram illustrating an example of a first dialog flow tree in accordance with exemplary embodiments.
Figure 4:
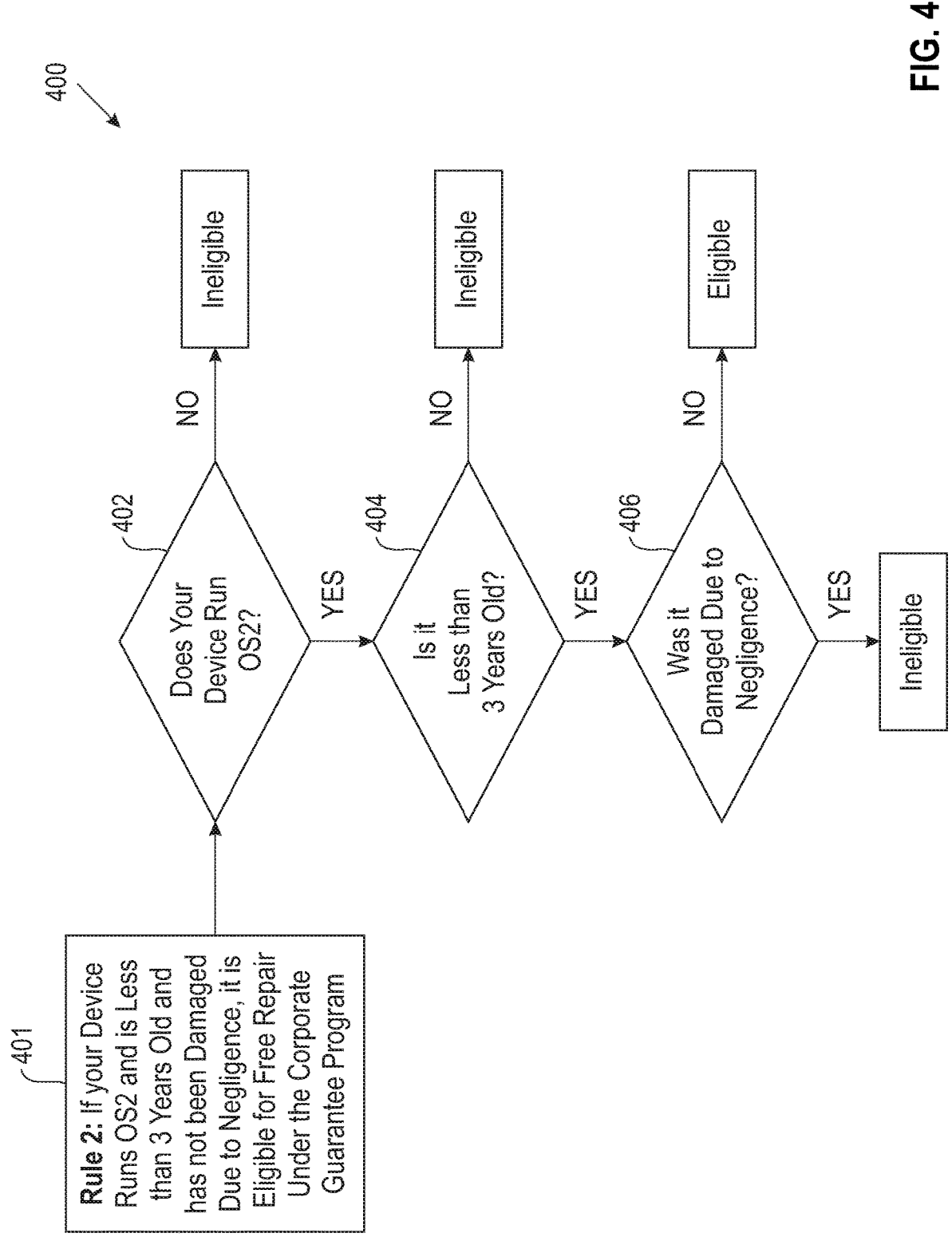
FIG. 4 is a diagram illustrating an example of a second dialog flow tree in accordance with exemplary embodiments.
Figure 5:
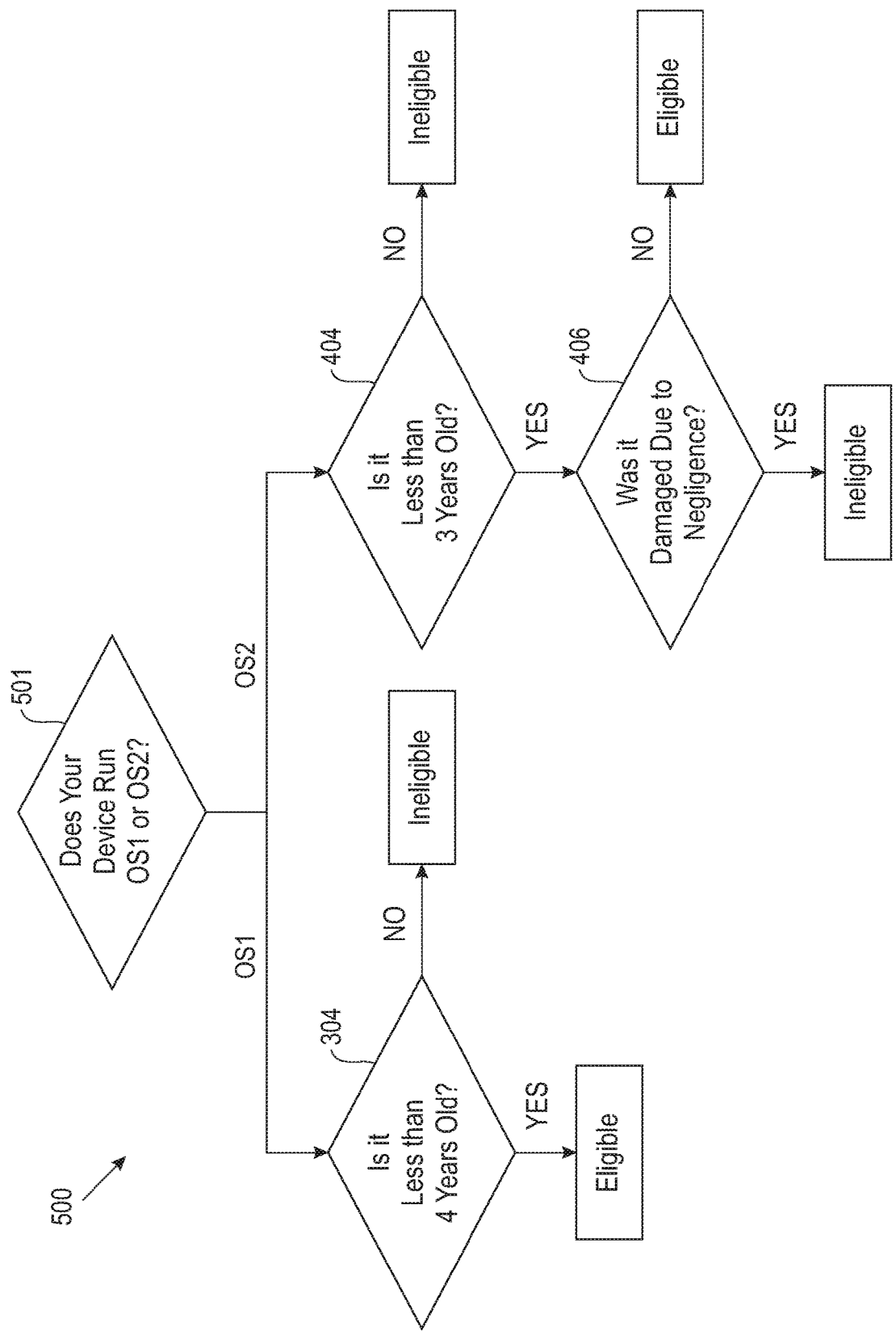
FIG. 5 is a diagram illustrating an example of a merged dialog flow tree in accordance with exemplary embodiments.

FIG. 3 shows an example of a first dialog tree 300, FIG. 4 shows an example of a second dialog tree 400, and FIG. 5 shows a dialog flow tree resulting from a merge process applied to dialog flow trees 300, 400 in accordance with exemplary embodiments. The dialog tree 300 may be generated based on a first rule document that includes rule 301. The dialog tree 300 includes a node 302 that corresponds to an initial question, namely, "Does your device run OS1?" If the answer is "no," then the device is "ineligible." If the answer is "yes," then the dialog flow tree 300 continues to node 304 which includes a follow-up question based on the rule 301, namely, "Is it less than 4 years old?" If the answer to question 304 is "yes," then the dialog tree indicates the device is "eligible"; otherwise the device is "ineligible."

The dialog tree 400 may be generated based on a second rule document that includes rule 401. The dialog tree 400 includes a node 402 that corresponds to the questions: "Does your device run OS2?" If the answer is no, then the device is "ineligible." If the answer is yes, then the dialog flow tree 400 continues to node 404 which includes a first follow-up question, namely, "Is it less than 3 years old?" If the answer to question 404 is "no", then the dialog tree indicates the device is "ineligible." If the answer to question 404 is "yes," then the dialog tree continues to node 406 which includes a second follow-up question, namely, "Was it damaged due to negligence?" If the answer to question 406 is "no", then the dialog tree 400 indicates the device is "eligible"; otherwise the device is "ineligible."

FIG. 5 shows a dialog tree 500 following a merge process (e.g., as described above) applied to trees 300, 400. The dialog tree 500 includes a parent node 501 which represents the following questions "Does your device run OS1 or OS2?" Please note that in this example, the merge process identified OS1 and OS2 as entities. If the answer to question 501 is "OS1," then the dialog tree 500 continues to node 304. If the answer to node 501 is "OS2," then the dialog tree continues to node 404.

Figure 6:
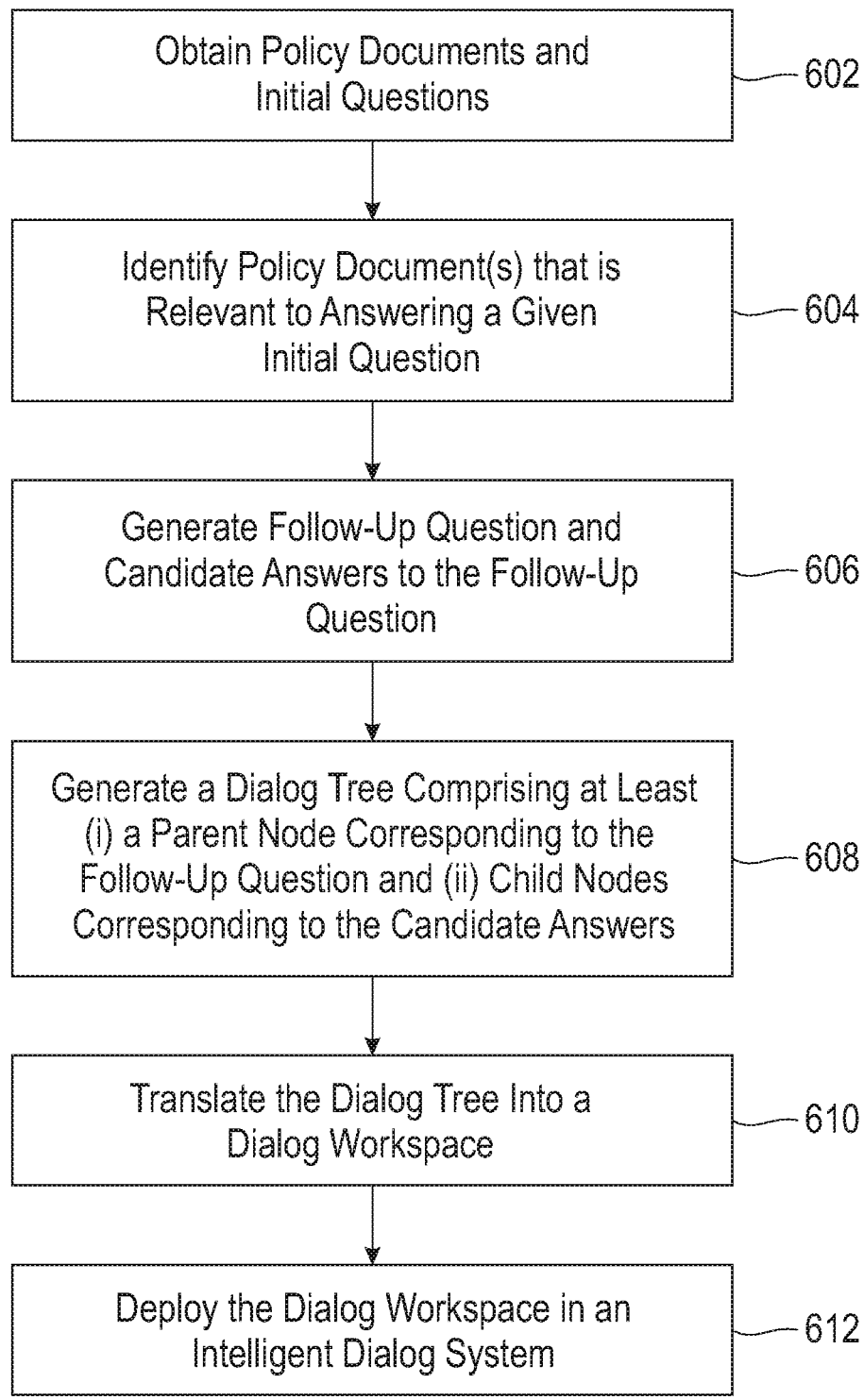
FIG. 6 is a flow diagram illustrating techniques in accordance with exemplary embodiments.

FIG. 6 is a flow diagram of a process according to an exemplary embodiment. Step 602 includes obtaining (i) a set of policy documents and (ii) a set of initial questions. Step 604 includes identifying at least one of the policy documents in the set of policy documents that is relevant to answering a given one of the initial questions in the set of initial questions. Step 606 includes generating, based at least in part on an analysis of said identified policy document, (i) at least one follow-up question to said given initial question and (ii) two or more candidate answers to said at least one follow-up question. Step 608 includes generating a dialog tree comprising at least (i) a parent node corresponding to the at least one follow-up question and (ii) child nodes corresponding to the two or more candidate answers. Step 610 includes translating the dialog tree into a dialog workspace. Step 612 includes deploying the dialog workspace in an intelligent dialog system.

The process may include a step of identifying one or more policy rules from the one or more policy documents, wherein the one or more policy rules comprise information for answering the given initial question. The process may include a step of obtaining at least one frequently asked questions document (FAQ); and extracting the set of initial questions from the at least one FAQ document.

At least a portion of the set of initial questions and/or at least a portion of the set of policy documents may be obtained from at least one online source. The two or more candidate answers to said at least one follow-up question may include (i) a "yes" answer and (ii) a "no" answer. The process may include steps of: generating an additional dialog tree corresponding to an additional one of the initial questions in the set; and merging said dialog tree and said additional dialog tree. The merging may be based at least in part on similarity between at least two of: the given initial question; the additional initial question; and one or more follow up questions corresponding to said given initial question and said additional initial question. Step 602 may include obtaining user-specific data, and wherein said generating the at least one follow-up question and the two or more candidate answers to said at least one follow-up question is based at least in part on said user-specific data. Obtaining the set of initial questions at step 602 may include at least one of: generating at least a portion of the set of initial questions based on the set of policy documents; and obtaining the set of initial questions via user input as part of a configuration process of the intelligent dialog system. The user-specific data may include one or more of (i) unstructured data and (ii) structed data.

According to another example embodiment, a method is provided, which includes identifying a set of policy rules from documentation information associated with a software application, wherein the set of policy rules are applicable for solving a given question listed on a frequently asked question page associated with said software application; applying said given question and at least one given policy rule in the set of policy rules to a machine learning model, the machine learning being trained to generate (i) one or more binary follow-up questions to said given question and (ii) two candidate answers for each of said one or more binary follow-up questions; generating a dialog tree for said given policy rule, wherein the dialog tree comprises, for each respective one of the binary follow-up questions: (i) a parent node associated with the binary follow-up question and (ii) two child nodes associated with the corresponding two candidate answers; and automatically populating a dialog workspace of an intelligent dialog system based at least in part on said dialog tree, wherein the dialog workspace comprises (i) a set of intents corresponding to the generated one or more binary follow-up questions and (ii) a set of dialog sequences based on traversals of said dialog tree.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 7:
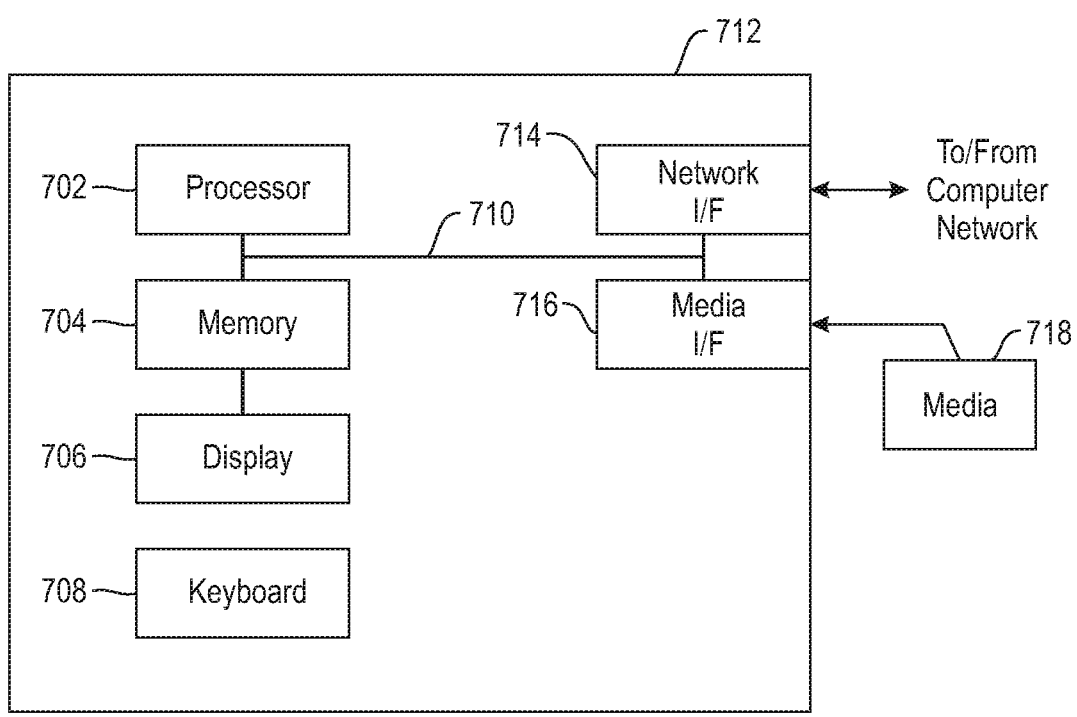
FIG. 7 is a system diagram of an exemplary computer system on which at least one embodiment of the present disclosure can be implemented.

Additionally, an embodiment of the present disclosure can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
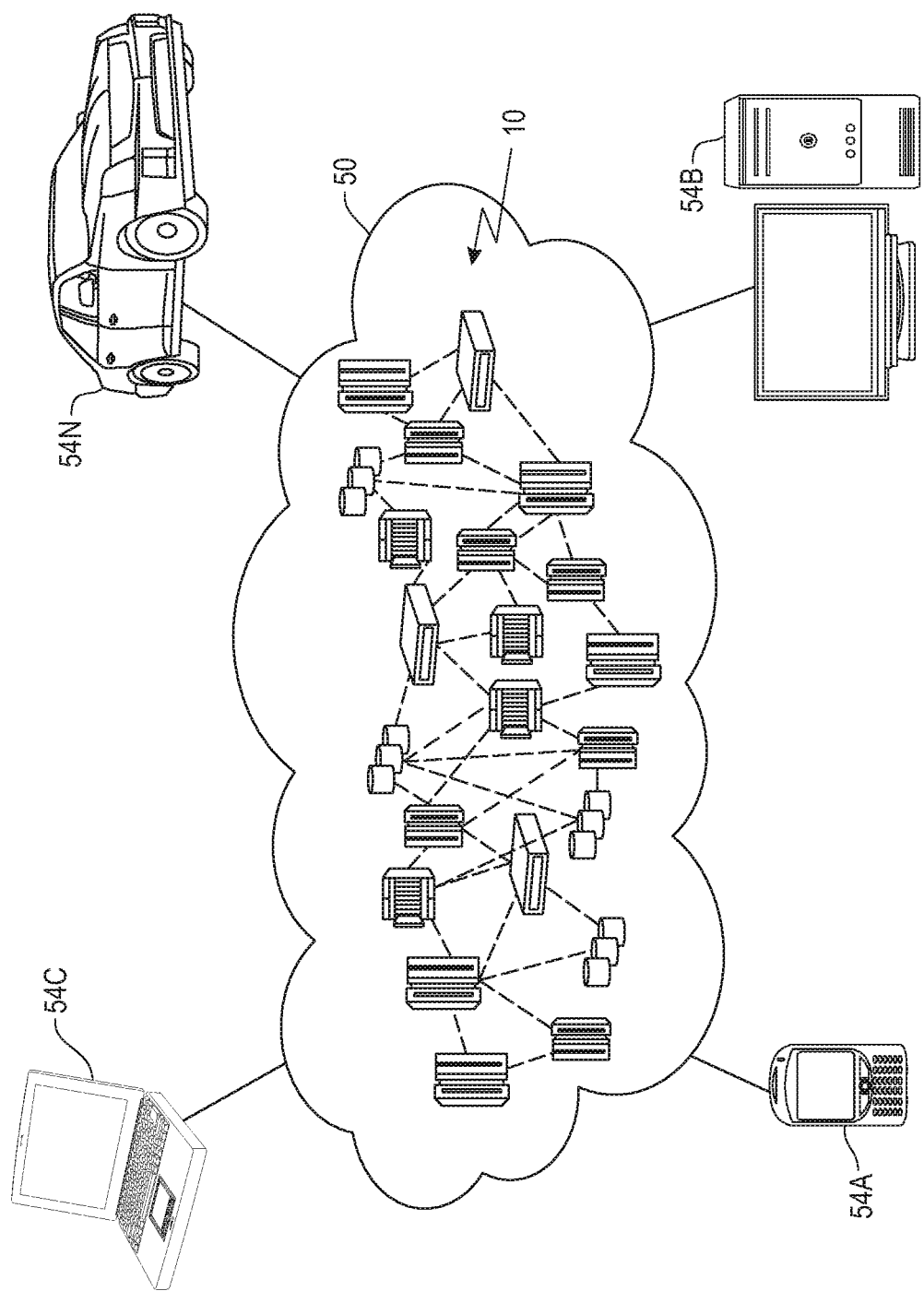
FIG. 8 depicts a cloud computing environment in accordance with exemplary embodiments.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
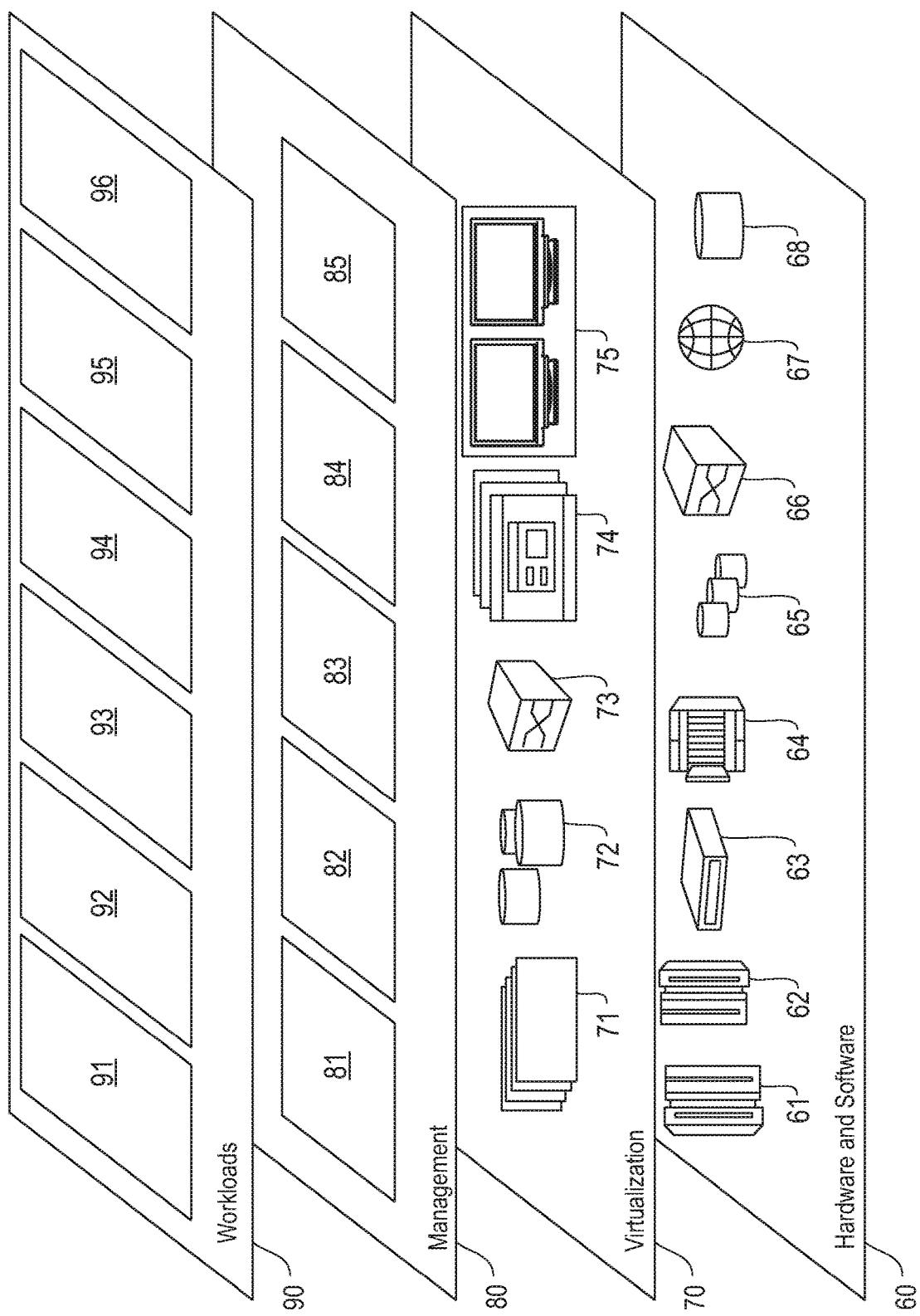
FIG. 9 depicts abstraction model layers in accordance with exemplary embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generation of dialog system workspaces 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, automatic generation of dialog workspaces using a set of documents and a list of questions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
obtaining a set of policy documents and a set of initial questions;
comparing a given one of the questions in the set of initial questions to the set of policy documents to identify a subset of the set of policy documents that is relevant to answering a given one of the initial questions in the set of initial questions;
generating, based at least in part on an analysis of said subset of policy documents, at least one follow-up question to said given initial question and two or more candidate answers to said at least one follow-up question;
generating a dialog tree comprising at least a parent node corresponding to the at least one follow-up question and child nodes corresponding to the two or more candidate answers;
translating the dialog tree into a dialog workspace; and
deploying the dialog workspace in a dialog system;
wherein the method is carried out by at least one computing device.

2. The computer-implemented method of claim 1, comprising:
identifying one or more policy rules from the one or more policy documents, wherein the one or more policy rules comprise information for answering the given initial question.

3. The computer-implemented method of claim 1, comprising:
obtaining at least one frequently asked questions document; and
extracting the set of initial questions from the at least one frequently asked questions document.

4. The computer-implemented method of claim 1, wherein at least a portion of the set of initial questions and/or at least a portion of the set of policy documents is obtained from at least one online source.

5. The computer-implemented method of claim 1, wherein the two or more candidate answers to said at least one follow-up question comprise a yes answer and a no answer.

6. The computer-implemented method of claim 1, comprising:
generating an additional dialog tree corresponding to an additional one of the initial questions in the set; and
merging said dialog tree and said additional dialog tree.

7. The computer-implemented method of claim 6, wherein said merging is based at least in part on similarity between at least two of:
the given initial question;
the additional initial question; and
one or more follow up questions corresponding to said given initial question and said additional initial question.

8. The computer-implemented method of claim 1, wherein said obtaining comprises:
obtaining user-specific data, and wherein said generating the at least one follow-up question and the two or more candidate answers to said at least one follow-up question is based at least in part on said user-specific data.

9. The computer-implemented method of claim 8, wherein said user-specific data comprise one or more of unstructured data and structured data.

10. The computer-implemented method of claim 1, wherein said obtaining the set of initial questions comprises at least one of:
generating at least a portion of the set of initial questions based on the set of policy documents; and
obtaining the set of initial questions via user input as part of a configuration process of the dialog system.

11. A computer program product comprising a non-transitory computer readable storage medium having program instructions embodied therewith, the program instructions executable by a computing device to cause the computing device to:
obtain a set of policy documents and a set of initial questions;
compare a given one of the questions in the set of initial questions to the set of policy documents to identify a subset of the set of policy documents that is relevant to answering a given one of the initial questions in the set of initial questions;
generate, based at least in part on an analysis of said subset of policy documents, at least one follow-up question to said given initial question and two or more candidate answers to said at least one follow-up question;
generate a dialog tree comprising at least a parent node corresponding to the at least one follow-up question and child nodes corresponding to the two or more candidate answers;
translate the dialog tree into a dialog workspace; and
deploy the dialog workspace in a dialog system.

12. The computer program product of claim 11, wherein the program instructions cause the computing device to:
identify one or more policy rules from the one or more policy documents, wherein the one or more policy rules comprise information for answering the given initial question.

13. The computer program product of claim 11, wherein the program instructions cause the computing device to:
obtain at least one frequently asked questions document; and
extract the set of initial questions from the at least one frequently asked questions document.

14. The computer program product of claim 11, wherein at least a portion of the set of initial questions and/or at least a portion of the set of policy documents is obtained from at least one online source.

15. The computer program product of claim 11, wherein the two or more candidate answers to said at least one follow-up question comprise a yes answer and a no answer.

16. The computer program product of claim 11, wherein the program instructions cause the computing device to:
generate an additional dialog tree corresponding to an additional one of the initial questions in the set; and
merge said dialog tree and said additional dialog tree.

17. The computer program product of claim 16, wherein said merging is based at least in part on similarity between at least two of:
the given initial question;
the additional initial question; and
one or more follow up questions corresponding to said given initial question and said additional initial question.

18. The computer program product of claim 11, wherein said obtaining comprises:
obtaining user-specific data, and wherein said generating the at least one follow-up question and the two or more candidate answers to said at least one follow-up question is based at least in part on said user-specific data.

19. A system comprising:
a memory configured to store program instructions; and
at least one processor operably coupled to the memory to execute the program instructions to:
obtain a set of policy documents and a set of initial questions;
compare a given one of the questions in the set of initial questions to the set of policy documents to identify a subset of the policy documents in the set of policy documents that is relevant to answering a given one of the initial questions in the set of initial questions;
generate, based at least in part on an analysis of said subset of policy documents, at least one follow-up question to said given initial question and two or more candidate answers to said at least one follow-up question;

generating a dialog tree comprising at least a parent node corresponding to the at least one follow-up question and child nodes corresponding to the two or more candidate answers;

translating the dialog tree into a dialog workspace; and deploying the dialog workspace in a dialog system.

20. A computer-implemented method, comprising:

identifying a set of policy rules from documentation information associated with a software application, wherein the set of policy rules are applicable for solving a given question listed on a frequently asked question page associated with said software application;

applying said given question and at least one given policy rule in the set of policy rules to a machine learning model, the machine learning model being trained to generate one or more binary follow-up questions to said given question and two candidate answers for each of said one or more binary follow-up questions;

generating a dialog tree for said given policy rule, wherein the dialog tree comprises, for each respective one of the binary follow-up questions: a parent node associated with the binary follow-up question and two child nodes associated with the corresponding two candidate answers; and automatically populating a dialog workspace of an dialog system based at least in part on said dialog tree, wherein the dialog workspace comprises a set of intents corresponding to the generated one or more binary follow-up questions and a set of dialog sequences based on traversals of said dialog tree;

wherein the method is carried out by at least one computing device.

* * * * *